Figure 1:
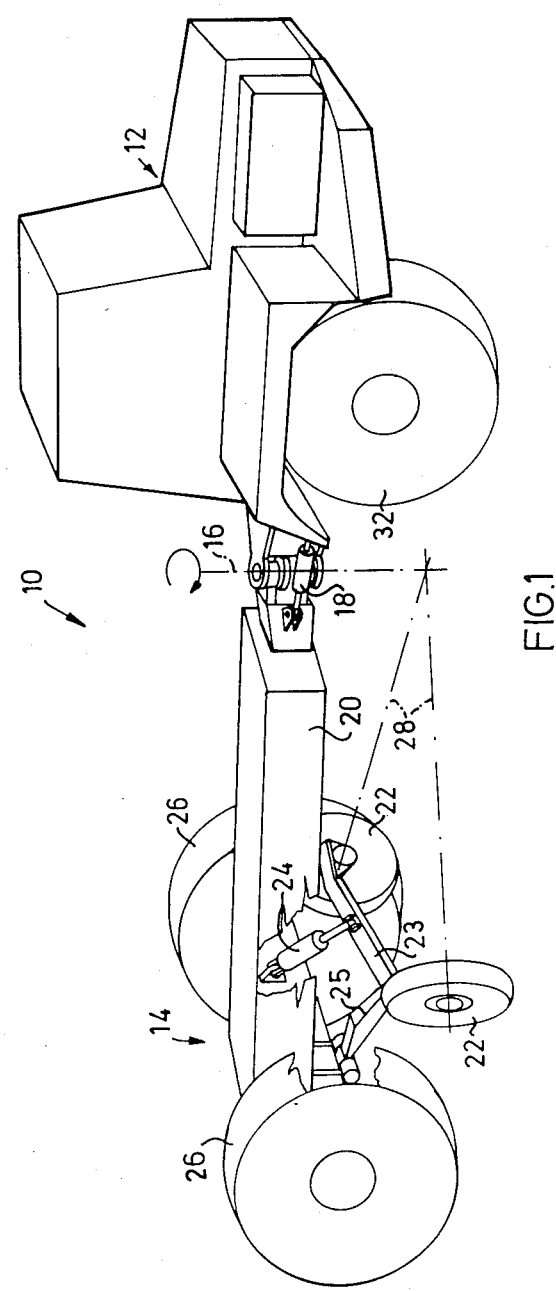

United States Patent [19]

Johansson

[11] Patent Number: 4,616,726
[45] Date of Patent: Oct. 14, 1986

[54] DEVICE FOR TURNING AN ARTICULATED MOTOR VEHICLE

[75] Inventor: Sixten Johansson, Eskilstuna, Sweden

[73] Assignee: VOLVO BM AB, Eskilstuna, Sweden

[21] Appl. No.: 793,296

[22] Filed: Oct. 31, 1985

[30] Foreign Application Priority Data

Nov. 8, 1984 [SE] Sweden ................................ 8405593

[51] Int. Cl.$^4$ ...................... B62D 13/06; B62D 53/00
[52] U.S. Cl. .................................... 180/135; 180/199;
280/423 R; 280/761; 280/DIG. 14
[58] Field of Search ............... 180/135, 134, 136, 137,
180/138, 139, 199, 200, 201, 202; 280/423 R,
761, 767, DIG. 14

[56] References Cited

U.S. PATENT DOCUMENTS

| | | | |
|---|---|---|---|
| 3,073,408 | 1/1963 | Winkler | 180/199 |
| 3,120,398 | 2/1964 | Butterworth | 180/199 X |
| 3,576,333 | 4/1971 | Danielson | 280/767 X |
| 3,589,462 | 6/1971 | Inagaki | 180/200 |

Primary Examiner—John A. Pekar
Attorney, Agent, or Firm—Young & Thompson

[57] ABSTRACT

The invention relates to a device for an articulated vehicle, for turning the vehicle about within a very limited space. According to the invention, the rear vehicle portion is provided with at least one supporting wheel mounted sideways, the axis of which lies in a vertical plane intersecting the vertical axis of articulation between the front and rear portions of the vehicle.

4 Claims, 2 Drawing Figures

DEVICE FOR TURNING AN ARTICULATED MOTOR VEHICLE

The present invention relates to articulated or frame steered motor vehicles, such as dumpers, comprising a front drive unit supporting vehicle portion and a rear load carrying vehicle portion, said vehicle portions being articulated about a vertical axis and swingable relative to each other about this axis by power means. More particularly, the present invention relates to a device in such a vehicle for turning said vehicle within the smallest possible radius.

In using such loader vehicles in tunnels and mines or in other narrow work places, it is often a problem to turn the vehicle around due to lack of space for making the turn. The length of the vehicle is often essentially the same as the width of the tunnel or road surface. In order to make it possible to turn the vehicle around in a tunnel or under similar circumstances, it has often been necessary to blast out niches in the tunnel wall. This is of course a very expensive method, especially since these niches must be cemented up again before the tunnel can be used.

In order to solve this problem, transportable turning platforms have been suggested in the tunnel, onto which the load carrying vehicle can be driven and turned 180°. Such turning platforms are bulky and expensive and must be moved from place to place as the tunnel construction progresses.

One purpose of the present invention is to remove the above mentioned disadvantages of the known technology and to provide a device which makes it possible to turn within a very narrow radius with the articulated load carrying vehicle and to do this with the aid of the vehicle's own frame steering system.

For this purpose the articulated vehicle according to the invention is characterized in that the rear vehicle portion is mounted on at least one supporting wheel, which can be lowered to the road surface to raise the rear vehicle portion, and which, in the lowered position, has its axis of rotation lying in a vertical plane substantially intersecting the vertical axis of articulation between the vehicle portions. After the portion supporting the load basket has been raised onto the support wheel or wheels high enough so that the wheels of the vehicle lose contact with the road surface, it will thus be possible to swing the rear portion of the vehicle in a single step in relation to the front portion, which is held stationary by locking the front wheels, with the aid of the power means (hydraulic cylinders) which normally produce the relative swinging of the front and rear portions. It is thus possible to utilize the entire steering range of the vehicle between the maximum steering position to the right and the maximum steering position to the left. This maximum steering range is normally an arc of about 90°.

The arrangement according to the invention makes it possible to swing the vehicle using the vertical axis of articulation between the vehicle portions as the center of rotation, thus achieving a minimum turning radius for the vehicle which is the radial distance from said axis of articulation to the outer corners of the longest vehicle portion, i.e. normally the rear vehicle portion supporting the load container.

Figure 2:
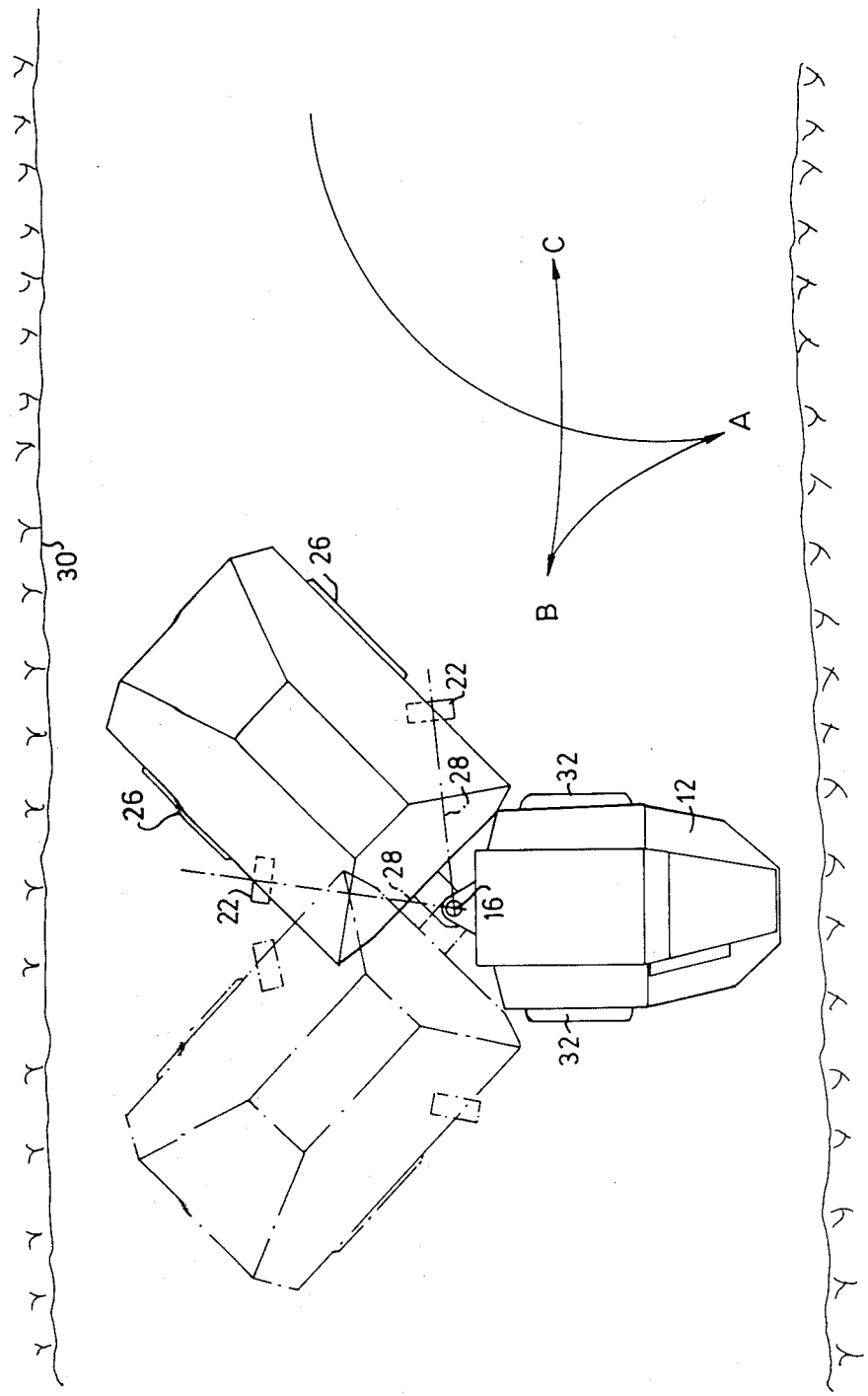

A suitable embodiment of the invention will now be described in more detail below with reference to the accompanying drawing, of which FIG. 1 is a schematic perspective view of a dumper equipped with supporting wheels according to the invention, and FIG. 2 shows schematically in a plane view a turning maneuver with the vehicle shown in FIG. 1 in a tunnel.

FIG. 1 shows an articulated vehicle, a so-called dumper 10, which has, as is known, a forward, drive unit supporting vehicle portion 12 and a rear, dumper body supporting vehicle portion 14 (the dumper body not shown), which is articulated to the forward vehicle portion 12 at a vertical axis 16. The front and rear vehicle portions 11 and 14 are also articulated to each other about a horizontal shaft (not shown), so that the vehicle portions can be twisted in relation to each other about a longitudinal axis through the vehicle. In order to steer the vehicle 10 when driven, the forward portion 12 is caused to swing about the vertical axis 16 with the aid of a pair of hydraulic power cylinders 18 disposed on either side of the axis of articulation 16.

In order to turn such a vehicle around in a very limited space, in a tunnel for example, a supporting wheel 22 is provided, according to the invention, on either side of the frame 20 of the rear vehicle portion 14. These supporting wheels can be lowered to the ground with the aid of a hydraulic cylinder 24, so that the rear part of vehicle portion 14 is lifted high enough so that the wheels 26 will lost contact with the ground. The supporting wheels 22 are journalled at either end of a cross bar 23, which is pivotally mounted on a link 25 at either end. The links 25 are hinged to the frame 20. The two supporting wheels 22 are oriented so that their axes each lie in a vertical plane intersecting the vertical axis 16 of articulation between the vehicle portions 12,14, as is indicated with dash-dot lines 28 in FIGS. 1 and 2.

With reference to FIG. 2, an example will now be described of how the dumper 10 is turned about in a tunnel, the width of which is only slightly greater than the length of the vehicle.

The vehicle is first driven close to one side wall 30 of the tunnel, whereafter the steering wheel is turned as far as possible in one direction, in this case to the left. When the vehicle has then reached the position shown in FIG. 2, the two supporting wheels 22 are lowered to the ground, whereupon the two wheels 26 of the rear vehicle portion 14 are lifted from the ground. The vehicle is now carried by the two supporting wheels 22 and the two front wheels 32 of the front vehicle portion 12. The front wheels 32 are then locked and the steering wheel is then turned as far as possible to the right, whereby the hydraulic frame steering cylinders will cause the rear vehicle portion 14 to swing approximately 90° to the position shown with dashed lines in FIG. 2. After this maneuver the supprting wheels 22 are retracted so that the rear portion 14 rests again on the wheels 26 in contact with the ground, whereafter the vehicle 10 is backed up a short distance before it can be driven forward again by steering to the left, now in the opposite direction in the tunnel. The arrows A, B and C in FIG. 2 indicate how the front end of the vehicle moves in the turning maneuver described above.

By virtue of the turning device according to the invention, in the form of obliquely disposed supporting wheels on the rear portion 14, it is possible to turn around an atriculated vehicle, the length of which is approximately the same as the distance between the lateral limits of the road, without the aid of external accessories, such as a turn-table, and without the need to create extra spaces such as niches or the like beside the road.

Even though the embodiment described and shown here has two obliquely journalled supporting wheels 22, it is also possible within the scope of the invention to provide a single supporting wheel, provided the vehicle does not have a horizontal articulation shaft, for twisting of the vehicle portions about a longitudinal axis.

I claim:

1. Articulated motor vehicle, especially a dumper, comprising a front drive unit supporting vehicle portion and a rear load carrying vehicle portion, said vehicle portions being articulated about a vertical axis and swingable in relation to each other about said axis by power means, characterized in that the rear vehicle portion is mounted on at least one supporting wheel, which can be lowered to the road surface to raise the rear vehicle portion and which, in the lowered position, has its axis of rotation lying in a vertical plane substantially intersecting the vertical axis of articulation between the vehicle portions.

2. Articulated motor vehicle according to claim 1, characterized in that the supporting wheel can be maneuvered between a retracted position and a lowered position by means of a hydraulic power cylinder.

3. Articulated motor vehicle according to claims 1, characterized in that two supporting wheels are arranged, one on either side of the frame of the rear vehicle portion and substantially opposite each other.

4. Articulated motor vehicle according to claim 3, characterized in that the supporting wheels are carried by the frame in front of the wheels of the rear vehicle portion.

* * * * *